United States Patent
Burghard et al.

(10) Patent No.: US 12,146,995 B2
(45) Date of Patent: Nov. 19, 2024

(54) RADIATION MONITORING DEVICES AND ASSOCIATED METHODS

(71) Applicant: Battelle Memorial Institute, Richland, WA (US)

(72) Inventors: Brion J. Burghard, West Richland, WA (US); William G. Bennett, West Richland, WA (US); Kurt L. Silvers, Pasco, WA (US); Anton S. Sinkov, Richland, WA (US); Erik S. Simunds, Kennewick, WA (US); Andrei B. Valsan, Richland, WA (US); Sean D. McGaughey, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 224 days.

(21) Appl. No.: 17/537,205

(22) Filed: Nov. 29, 2021

(65) Prior Publication Data

US 2023/0168390 A1  Jun. 1, 2023

(51) Int. Cl.
*G01T 1/17* (2006.01)
*G21F 5/015* (2006.01)
(Continued)

(52) U.S. Cl.
CPC .................. *G01T 1/17* (2013.01); *G21F 5/12* (2013.01); *G21F 5/015* (2013.01); *G21F 5/06* (2013.01)

(58) Field of Classification Search
CPC ... G01T 1/17; G21F 5/015; G21F 5/06; G21F 5/12
See application file for complete search history.

(56) References Cited

U.S. PATENT DOCUMENTS

| | | | | |
|---|---|---|---|---|
| 3,102,958 A | * | 9/1963 | King | G21F 5/015 250/431 |
| 4,682,035 A | * | 7/1987 | Shulman | G01T 7/00 250/370.07 |

(Continued)

FOREIGN PATENT DOCUMENTS

| | | |
|---|---|---|
| CA | 3112699 | 3/2020 |
| CN | 205302965 U | 6/2016 |

(Continued)

OTHER PUBLICATIONS

Asociacion RUVID, "Portable Device Capable of Monitoring Gamma Radiation and Neutrons in Radioactive and Nuclear Processes", available online at https://phys.org/news/2021-11-portable-device-capable-gamma-neutrons.html, Nov. 15, 2021, 3 pages.

(Continued)

*Primary Examiner* — Blake C Riddick
(74) *Attorney, Agent, or Firm* — Wells St. John P.S.

(57) ABSTRACT

Radiation monitoring devices and associated methods are described. According to one aspect, a radiation monitoring device includes a housing configured to pass radiation emitted from a radiological source located in proximity to the radiation monitoring device, a radiation detector configured to receive the radiation emitted from the radiological source and to generate information regarding the radiation, and communications circuitry configured to communicate the information regarding the radiation in a plurality of communications at a plurality of different moments in time externally of the radiation monitoring device.

20 Claims, 15 Drawing Sheets

(51) Int. Cl.
*G21F 5/06* (2006.01)
*G21F 5/12* (2006.01)

(56) References Cited

U.S. PATENT DOCUMENTS

| | | | |
|---|---|---|---|
| 8,237,575 B2 | 8/2012 | MacLean, III et al. | |
| 10,234,576 B2 | 3/2019 | Marriott et al. | |
| 2004/0065837 A1* | 4/2004 | Schick | G01T 1/246 |
| | | | 250/370.08 |
| 2005/0219046 A1* | 10/2005 | Noguchi | G08B 29/046 |
| | | | 340/568.1 |
| 2006/0220919 A1* | 10/2006 | Pitts, Jr. | G08B 21/0269 |
| | | | 340/963 |
| 2006/0249664 A1* | 11/2006 | Beinhocker | G01T 1/167 |
| | | | 250/227.15 |
| 2007/0096037 A1* | 5/2007 | Shapiro | G01T 1/167 |
| | | | 250/394 |
| 2009/0046828 A1* | 2/2009 | Ohta | A61B 6/56 |
| | | | 378/1 |
| 2009/0109040 A1* | 4/2009 | MacLean, III | G21F 5/06 |
| | | | 340/600 |
| 2009/0115607 A1* | 5/2009 | Beinhocker | G08B 13/126 |
| | | | 340/541 |
| 2010/0156593 A1* | 6/2010 | Ohta | G03B 42/04 |
| | | | 250/370.08 |
| 2011/0005282 A1* | 1/2011 | Powers | G08B 25/10 |
| | | | 70/63 |
| 2011/0234378 A1* | 9/2011 | Radley | G01T 7/00 |
| | | | 340/10.1 |
| 2012/0235051 A1* | 9/2012 | MacLean, III | G21F 5/06 |
| | | | 250/336.1 |
| 2014/0124678 A1* | 5/2014 | Yoneyama | H04N 25/75 |
| | | | 250/393 |
| 2014/0312235 A1* | 10/2014 | Harden | G01V 5/0075 |
| | | | 250/358.1 |
| 2014/0368345 A1* | 12/2014 | Dobbins | G08B 13/02 |
| | | | 340/5.28 |
| 2015/0254948 A1* | 9/2015 | Acosta | G08B 13/08 |
| | | | 340/541 |
| 2017/0140332 A1* | 5/2017 | Rinzler | G06K 7/10415 |
| 2020/0027613 A1* | 1/2020 | Harmon | A47B 55/00 |
| 2022/0035959 A1* | 2/2022 | Mobley | G06F 21/86 |

FOREIGN PATENT DOCUMENTS

| | | |
|---|---|---|
| WO | WO 2020/058686 | 3/2020 |
| WO | WO PCT/US2021/061030 | 5/2024 |

OTHER PUBLICATIONS

D-tect Systems, "MiniRad-D", Product Brochure, 2013, United States, 2 pages.

* cited by examiner

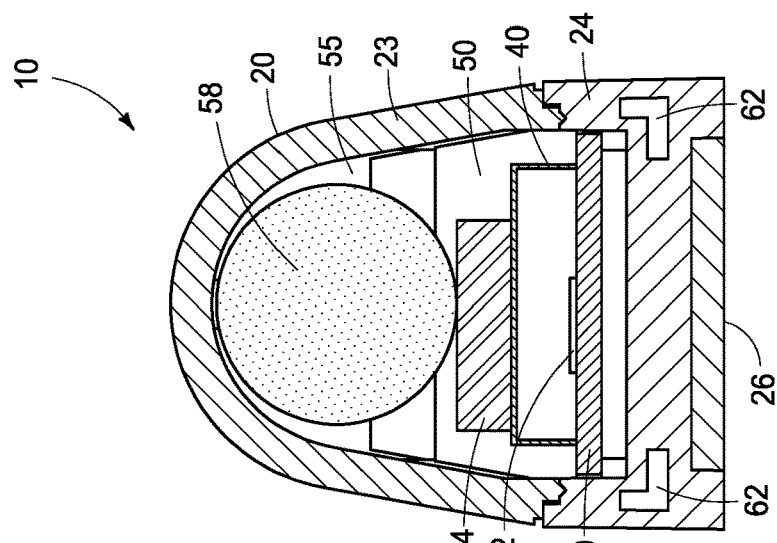
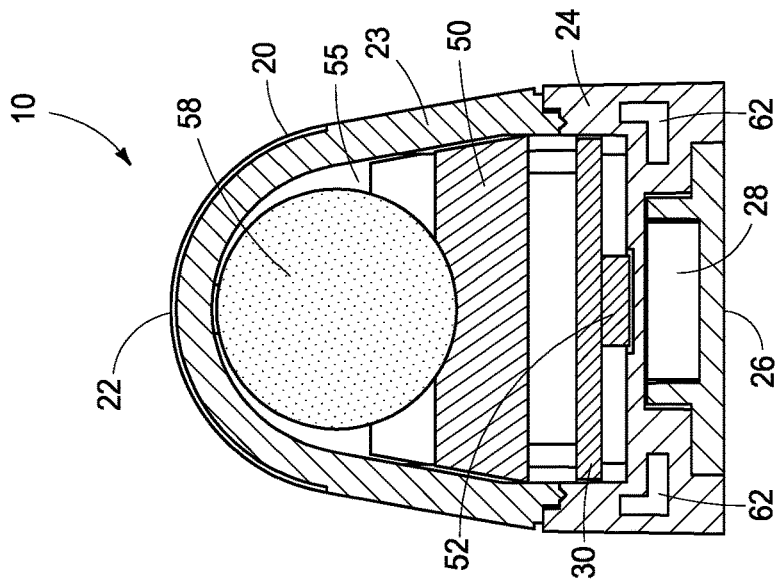
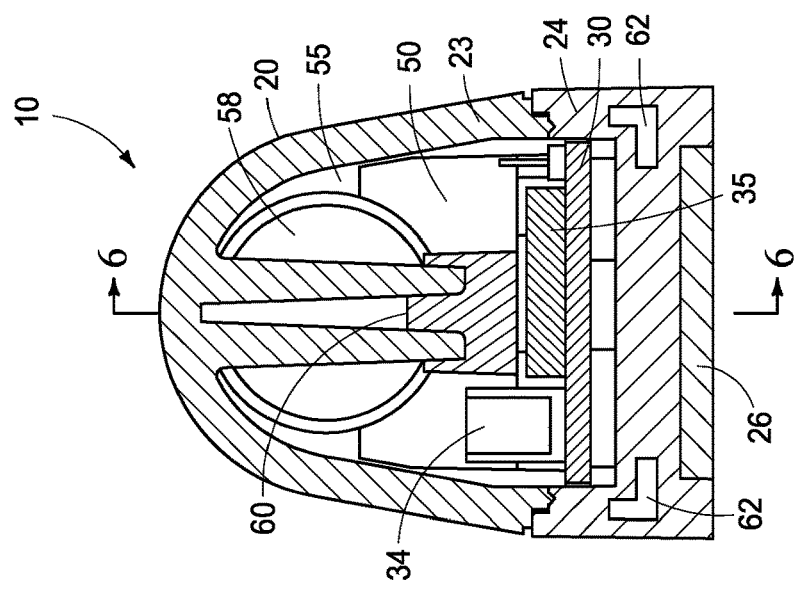

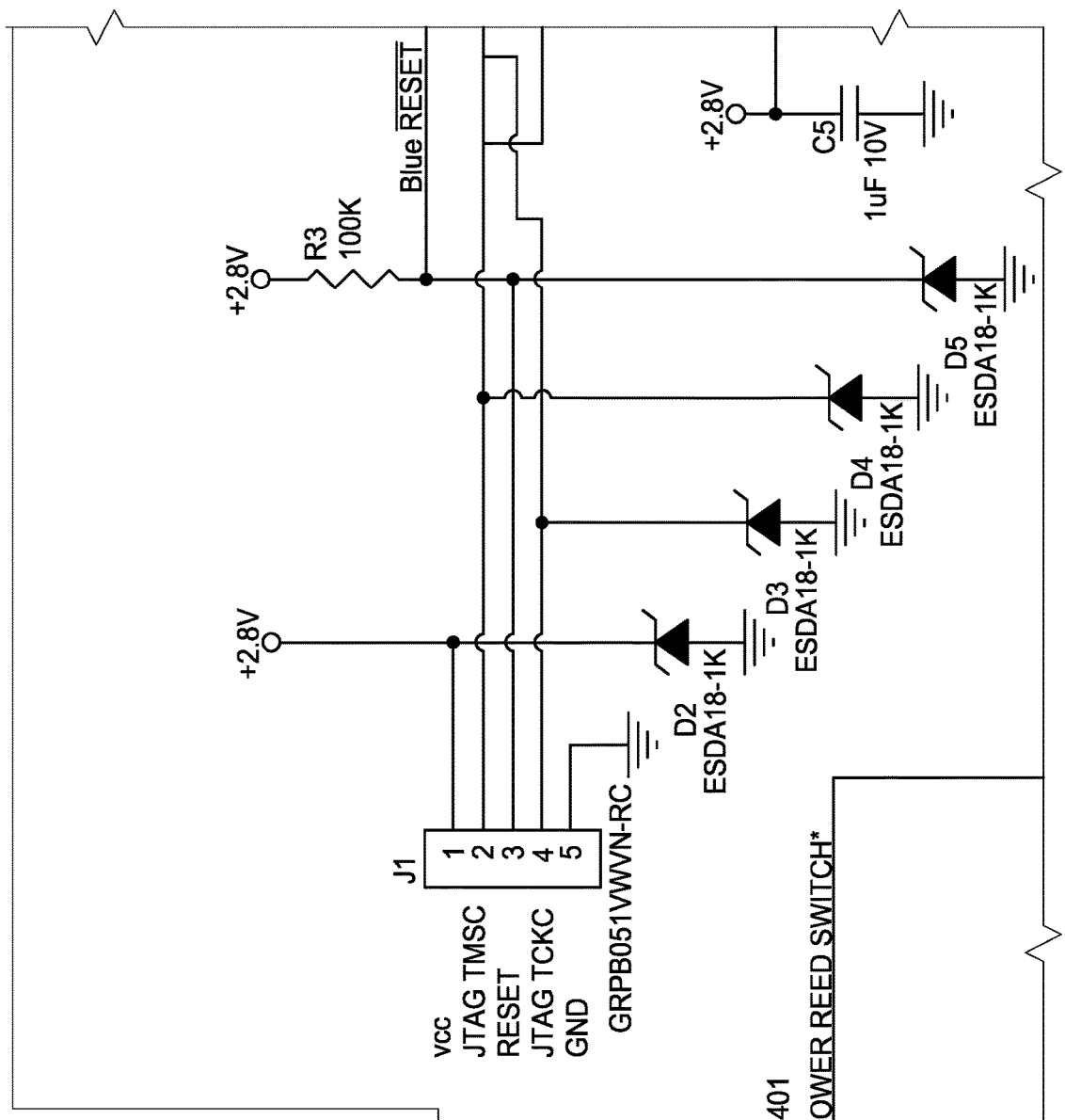

RADIATION MONITORING DEVICES AND ASSOCIATED METHODS

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to radiation monitoring devices and associated methods.

BACKGROUND OF THE DISCLOSURE

Radiological or radioactive materials are often utilized in industry including various uses in the oil and gas service industry. The radiological material may be used to assist with the determination and logging of geological features of an oil well, such as porosity or proximity to oil. Other devices that utilize radiological material are commonly used for industrial radiography, where the devices are used to inspect welds on job sites. These are illustrative examples of some uses of radioactive materials in industry.

The radiological materials emit radiation and are accordingly provided in source shields for safety during storage and transportation of the radiological material. Source shields are often manufactured from lead and reduce the amount of radiation emitted from the radiological material into the surrounding environment to safe levels. In some applications, source shields may be used during transportation of the radiological material from a home base of operation to a job site and back. A transport such as a truck or overpack may be used for transportation of the source shields containing the radiological material(s).

At least some aspects of the disclosure described herein are directed towards radiation monitoring devices and associated methods of monitoring radiological material including monitoring of radiological sources provided in source shields. The disclosed apparatus and methods may be used in various applications to enhance situational awareness and security of stored and mobile radiological material.

BRIEF DESCRIPTION OF THE DRAWINGS

Example embodiments of the disclosure are described below with reference to the following accompanying drawings.

FIGS. 7A-7C are cross-sectional end views of one embodiment of a radiation monitoring device taken through respective section lines 7A, 7B, 7C of FIG. 6.

FIG. 8 is a map illustrating how FIGS. 8A-8F are to be arranged, and once arranged, FIGS. 8A-8F depict a schematic representation of circuitry of one embodiment of a radiation monitoring device.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Figure 1:
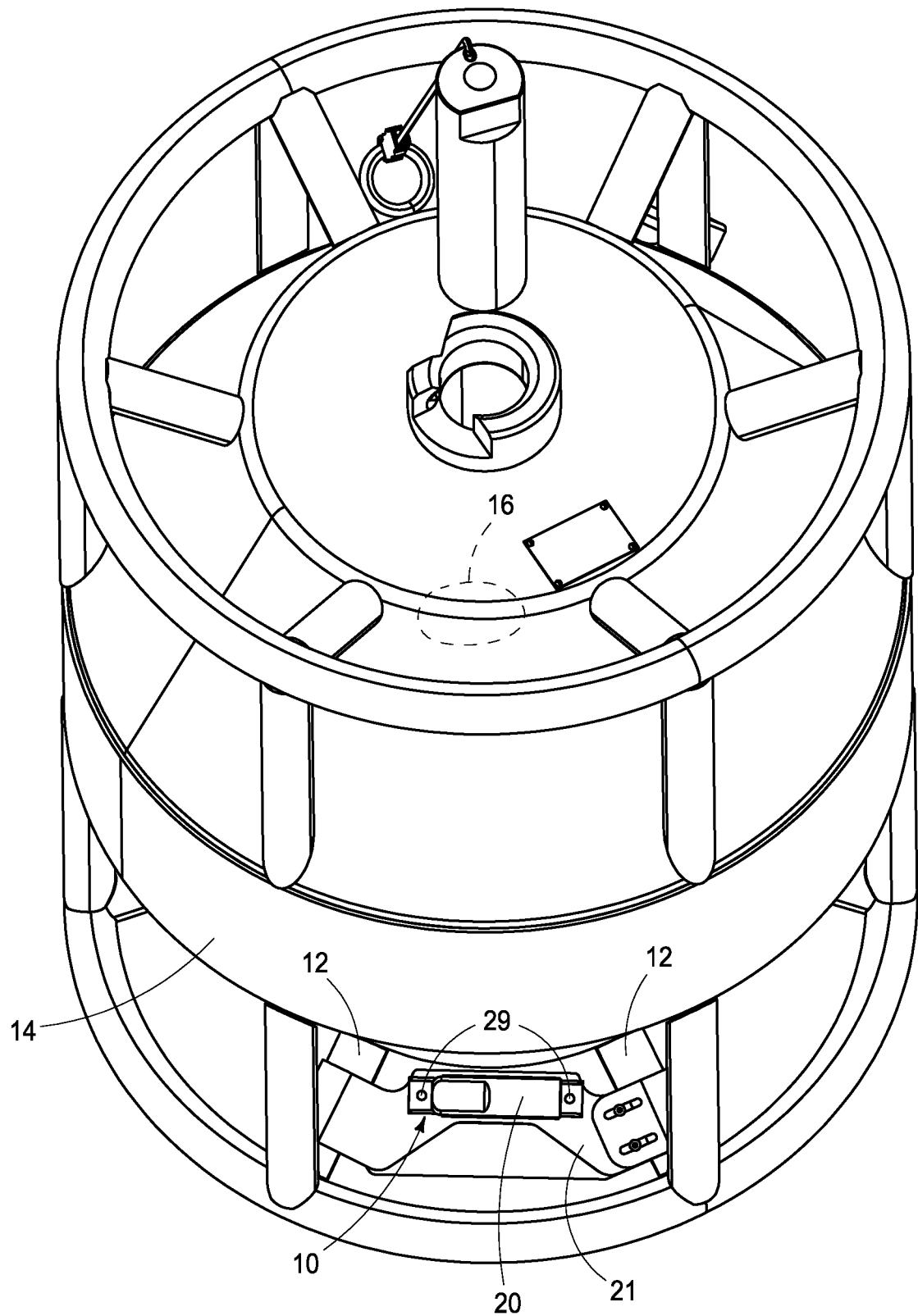
FIG. 1 is an isometric view of one embodiment of a radiation monitoring device attached to radiological material storage container.

Referring to FIG. 1, an example embodiment of a radiation monitoring device 10 is shown. As discussed below, the illustrated radiation monitoring device 10 is configured to monitor radiation, such as gamma radiation, in the environment about the device 10. In the example implementation shown in FIG. 1, the radiation monitoring device 10 is attached to legs 12 of a radiological material storage container 14, such as a source shield.

The radiological material storage container 14 contains a radiological or radiological source 16, such as a source that emits gamma or other types of radiation. The storage container 14 comprises a suitable material, such as lead, to shield and protect the environment from radiation emitted from the radiological source 16. The illustrated radiological material source container 14 may be used to safely store and transport radiological source 16. Radiation monitoring device 10 may be mounted to Cs137 and AmBe241 storage containers 14 used in the oil and gas service industry in example embodiments. In some applications, device 10 is designed to improve situational awareness and security of radiological sources 16 as the sources 16 and storage containers 14 move from the home base of operation to a job site and back in a suitable transport.

In some embodiments, the device 10 includes a housing 20 that is attached to the radiological material storage container 14 in a manner to avoid removal of the device 10 except by appropriate authorized and qualified personnel to handle radiological sources 16. An attachment assembly 21 is used in some embodiments to attach the device 10 to the container 14. The illustrated example attachment assembly 21 is in the form of a metal mounting bracket that is affixed to the housing 20 and container 14 using appropriate hardware, such as rivets 29. Accordingly, in some embodiments, the device 10 is positioned at a known, fixed distance from the radiological source 16 enabling monitoring of amounts of radiation emitted by the source 16 externally of the storage container 14. In addition, direct attachment of the device 10 to the storage container 14 enables accurate radiation monitoring compared to arrangements where the monitoring devices are remote from the storage containers 14 and where monitored activity may be influenced by orientation or movement of the storage container 14 within the transport.

Figure 2:
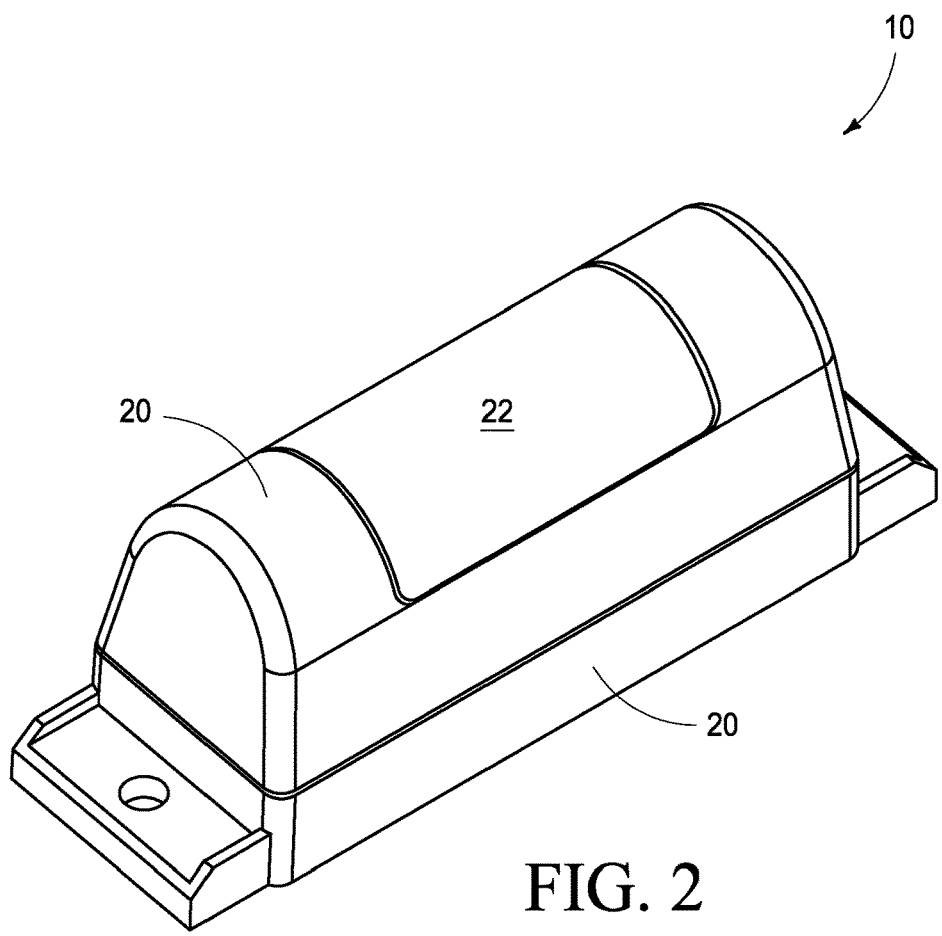
FIG. 2 is an isometric view of a radiation monitoring device according to one embodiment.

Referring to FIG. 2, the housing 20 encloses and protects internal components and circuitry of device 10 in one embodiment. In addition, housing 20 is configured to pass radiation present in the environment of the device 10 to internal components of the device 10 in the described embodiment allowing the activity or amount of radiation present in the environment of the device 10 to be monitored. The monitored radiation is emitted from radiological source 16 in proximity to the radiation monitoring device 10.

A label 22 may be affixed to housing 20 and include one or more identification codes that uniquely identify the device 10, container 14, radiological source 16 therein and/or other information. Label 22 is polylaminate with a suitable adhesive in one embodiment.

Figure 3:
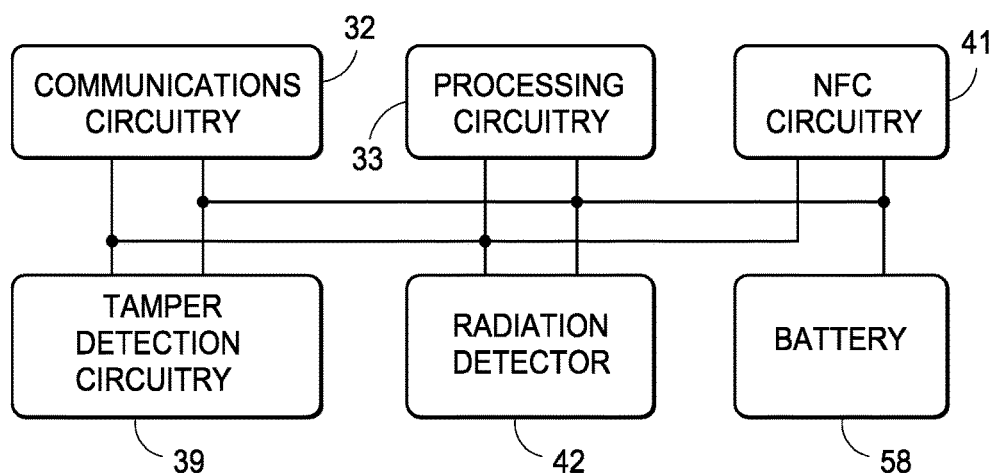
FIG. 3 is a block diagram of components of a radiation monitoring device according to one embodiment.

Referring to FIG. 3, a block diagram of circuit components of one embodiment of the device 10 is shown. The illustrated device 10 includes communications circuitry 32, processing circuitry 33, near-field communications (NFC) circuitry 41, tamper detection circuitry 39, a radiation detector 42 and a battery 58. Other embodiments of device 10 are possible including more, less and/or alternative components.

Communications circuitry 32 is configured to communicate signals externally of the device 10. In one embodiment, the communications circuitry 32 emits wireless communications that are received and processed by a remote monitoring device or system (not shown). Communications circuitry 32 may emit the communications at a plurality of different moments in time externally of the radiation monitoring device 10 operating as a beacon for reception by an appropriate receiver within the communications range of the device 10 in one illustrative embodiment. The communications circuitry 32 emits BLUETOOTH® Low Energy (BLE) communications in one embodiment although other wireless protocols may be utilized. As discussed further below, the device 10 may transmit communications to BLE receivers of the remote monitoring system by broadcasting advertisement packets on a periodic basis in one embodiment.

The emitted communications may include various information including information regarding the monitored radiation as well as additional information discussed below. In some embodiments, the communicated information includes activity information that is indicative of an amount of the radiation detected by the radiation detector 42 (e.g., a number of counts received over a period of time). The outputted communications may include information regarding the status of radiation monitoring device 10 (e.g., current energy level of the battery and tampering), one or more identification codes that uniquely identify the device 10, container 14 and/or radiological source 16 therein, and/or additional information.

Processing circuitry 33 is configured to process data and control various operations of device 10 described herein, such as, control of data access and storage, control of communications, control of power management, and other desired operations. Processing circuitry 33 comprises circuitry configured to implement desired programming provided by appropriate computer-readable storage media in at least one embodiment. For example, the processing circuitry 33 may be implemented as one or more processor(s) and/or other structure configured to execute executable instructions including, for example, software and/or firmware instructions. Other example embodiments of processing circuitry 33 include hardware logic, PGA, FPGA, ASIC, state machines, and/or other structures alone or in combination with one or more processor(s). These examples of processing circuitry 33 are for illustration and other configurations are possible. Processing circuitry control the generation of the communications As mentioned above, processing circuitry 33 may control power consumption operations of the device 10 during radiation monitoring and communications. For example, the processing circuitry 33 may control the communications circuitry 32 to not emit electromagnetic energy during moments in time when the radiation detector 42 is monitoring received radiation. Furthermore, the processing circuitry 33 may control the communications circuitry 32 to enter a mode of increased energy consumption to transmit the signals externally of the device 10. The processing circuitry 33 may also power down the radiation detector 42 during transmission of communications. The controlling of the communications circuitry 33 and radiation detector 42 as described above reduces interference of emitted electromagnetic energy with the radiation detector 42 during radiation monitoring operations as well as reduces the power consumption of the device 10.

In normal operating mode of one embodiment of the device 10, the communications circuitry 32 only advertises (transmits data) once every 11 seconds to save power compared to continuous communications. Each communication lasts for about 3 ms out of every 11 second period and uses about 19.6 milliwatts of power compared to 9 microwatts of power while not transmitting and providing an average draw during operation of 13.7 microwatts.

In one embodiment, the radiation detector 42 is enabled for 10 seconds at a time between periodic communications from device 10 in order to accumulate radiation counts. During radiation monitoring, the detector 42 described below uses approximately 10 uA and approximately 10 nA when powered down.

In one embodiment, near-field communications circuitry 41 is used to implement power management operations of the device 10 including waking device 10 up from a shutdown or deep sleep low power consumption state into an operational state, and configuring the device 10 upon start-up and deployment of the device 10 in the field to monitor a respective radiological source 16.

In one embodiment, the communications circuitry 32, processing circuitry 33, NFC circuitry 41 and additional components of device 10 may be provided in a reduced mode of power consumption (i.e., shutdown state) following manufacture of device 10 (including provision of the battery 58 and other components within the device 10), during storage of device 10, and prior to usage of the device 10 in the field. The rate of drain upon the battery 58 is approximately 200 nA in the shutdown state of device 10 which allows the device 10 to remain in storage for years without noticeably draining the battery.

An NFC interrogator or programmer (not shown) is used in the described embodiment to provide the device 10 in an operational mode of increased power consumption, configure device 10 and provide device 10 in an operational state to monitor the presence of radiation in the environment of the device 10 and to implement external communications described herein. The provision of device 10 in a shutdown state at the time of manufacture reduces battery usage during storage.

Figure 4:
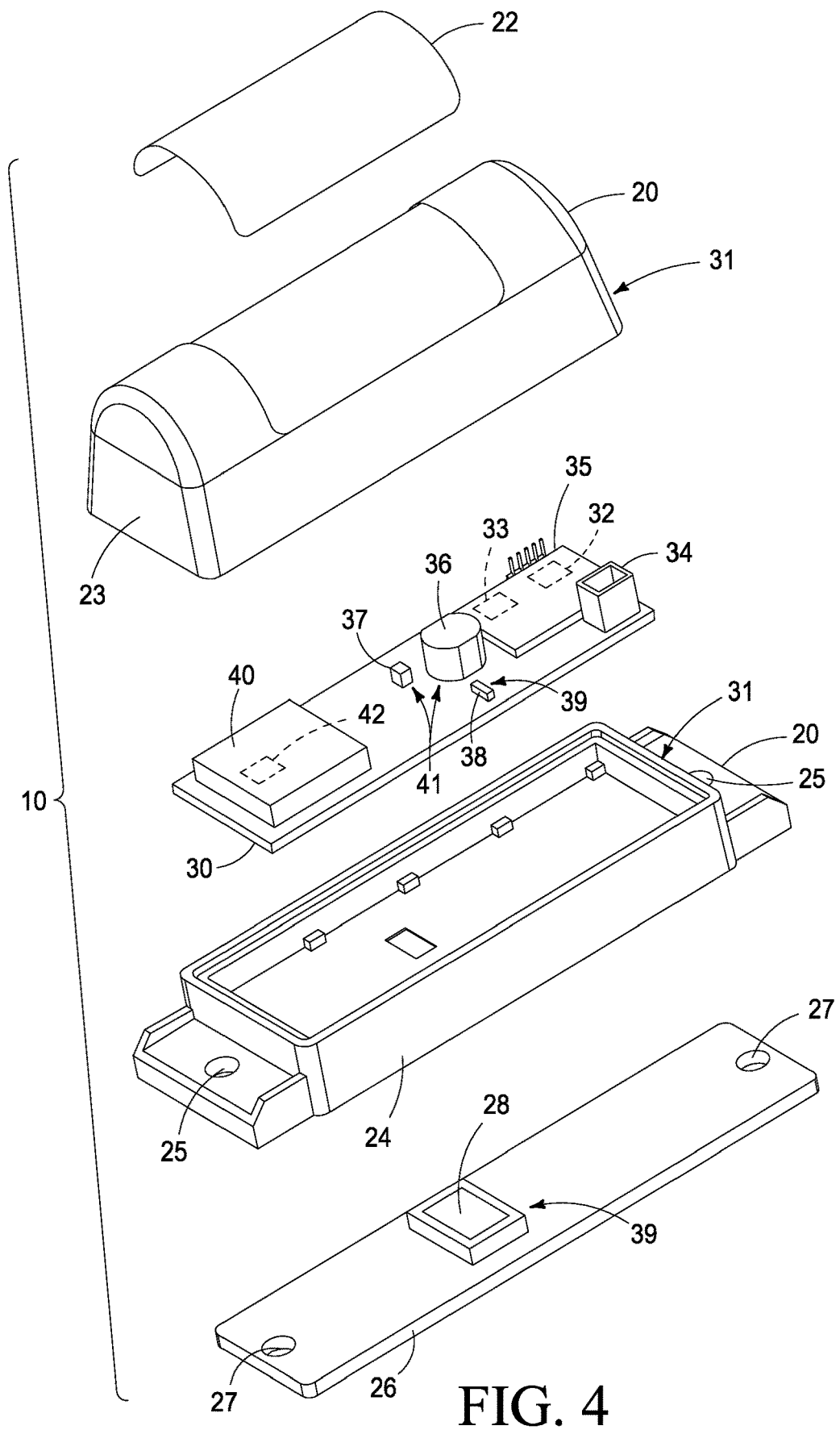
FIG. 4 is an exploded top isometric view of a radiation monitoring device according to one embodiment.

When the unit is ready to be deployed, configured or reconfigured, the NFC programmer emits electromagnetic energy (e.g., 13.5 MHz signal) which is received by an antenna of the NFC circuitry 41 and provides operational energy to an NFC receiver of the NFC circuitry 41 in one embodiment (example NFC circuitry 41 including the antenna 36 and receiver 37 are shown in FIG. 4). Accordingly, operational energy is provided by the NFC interrogator from external of the device 10 to wake-up and configure the device 10 and initiate radiation monitoring and communication operations of the device 10 following manufacture of the device 10 and perhaps storage thereof.

The NFC programmer downloads configuration information to the NFC circuitry 41 to configure device 10 for use. The configuration information is stored as a file within the NFC receiver 37 and the programmer sets a flag for the processing circuitry 33 to read the configuration file from receiver NFC 37. Example configuration information that is downloaded from the NFC interrogator may include an identification code that uniquely identifies the device 10, an identifier of the type of radiological source 16 being monitored, an identifier of the storage container 14, and other desired information. In other embodiments, another Bluetooth enabled device may download configuration information to device 10 and NFC circuitry 41 may be omitted.

Following configuration, the NFC receiver 37 toggles or sets a wake-up signal. Processing circuitry 33 periodically monitors for the reception of the wake-up signal from the NFC receiver 37 when operating in the mode of reduced energy consumption, and processing circuitry 33 enters an operational mode of increased power consumption once the wake-up signal is detected. Once the processing circuitry 33 is woken up from the shutdown state, it reads the configuration data stored in the NFC receiver 37, configures the device 10 accordingly and initiates radiation monitoring operations and outputting of communications.

Tamper detection circuitry 39 is configured to monitor and log tampering events with respect to device 10. In a first aspect, tamper detection circuitry 39 includes a magnet 28 and a reed-switch 52 that are configured to monitor tampering including removal of radiation detector 42 from the radiological material storage container 14 as discussed further below. In another aspect, tamper detection circuitry 39 includes a light detector 38 that is configured to monitor tampering with respect to intrusions into the housing 20 of device 10 by monitoring for the presence of light as discussed below. This allows the remote monitoring system to monitor the status of the physical state of the device 10 and verify the integrity of the data obtained from the advertisements of the device 10.

Radiation detector 42 is configured to monitor radiation present in the environment of the radiation monitoring device 10 including radiation emitted from the radiological source 16 being monitored and to generate information regarding the monitored radiation. Radiation detector 42 is configured to monitor for the presence of radiation that passes through housing 20 and is received at the radiation detector 42. Pulses generated by the radiation detector 42 are provided to an event counter shown in FIG. 8C which counts the number of pulses corresponding to radiation received by the detector 42 over an amount of time in one embodiment. The event counter is utilized to record counts detected by the radiation detector 42 and the processing circuitry 33 may be selectively powered down during counting to reduce energy consumption from battery 58. The processing circuitry 33 may read the count from the event counter as information indicative of the amount of received radiation and that may be communicated externally of the device 10 using the communications circuitry 32.

Battery 58 provides operational electrical energy to circuitry and components of the radiation monitoring device 10. In one embodiment, battery 58 is implemented as a 3.6V Lithium battery although other batteries or other sources of operational electrical energy may be used in other embodiments. Some embodiments of the device 10 discussed below are configured to implement one or more power saving operations to extend or maximize the life of the battery 58. Example devices 10 disclosed herein are designed to have a minimum of a 3 year life span for monitoring a radiological source.

Referring to FIG. 4, an exploded top view of the radiation monitoring device 10 of FIG. 2 and internal components and circuitry thereof is shown according to one embodiment. The illustrated housing 20 includes a top 23 and base 24 that are joined together (e.g., using sonic welding in one example) to form an enclosure assembly 31 that defines an internal light-tight compartment or chamber that encloses various components and circuitry of device 10 as described further below. A template 26 is also shown that is provided below the base 24 and is attached to the enclosure assembly 31 as discussed further below. The illustrated template 26 includes orifices 27 that may receive rivets or other fasters utilized to secure the enclosure assembly 31 to template 26 and device 10 in an installed location.

In the depicted embodiment, a printed circuit board (PCB) 30 is provided within the light-tight compartment defined by the housing 20. The communications circuitry 32 and processing circuitry 33 are implemented as a BLE Module integrated circuit 35 in the illustrated example implementation. Furthermore, storage circuitry configured to store information internally of device 10 is additionally included in integrated circuit 35 in one embodiment. The communications circuitry 32, processing circuitry 33 and storage circuitry may be implemented as separate components in other embodiments.

A plurality of additional components of device 10 including a battery connector 34, NFC circuitry 41 including an NFC antenna 36 and NFC receiver 37, a light detector 38, a metal can 40 and a radiation detector 42 are also shown in the example embodiment.

Battery connector 34 is coupled with plural terminals of a battery (not shown in FIG. 4) that is configured to provide operational electrical energy to circuitry and components of device 10.

Tamper detection circuitry 39 comprising a light detector 38 is also provided in some embodiments to monitor for the presence of light received thereby and inside of the light-tight compartment that may indicate tampering of the device 10 including intrusion into the light-tight compartment defined by the enclosure assembly 31 including top 23 and base 24 of housing 20. Following detection of light by the light detector 38, processing circuitry 33 may set a flag or status to include in external communications indicating the possible tampering.

Metal can 40 is provided around radiation detector 42 and functions as a radio frequency (RF) shield that shields the radiation detector 42 from electromagnetic energy including RF energy within housing 20.

Base 24 comprises orifices 25 for reception of rivets (not shown in FIG. 4) or other fastener for secure attachment of device 10 directly to storage container 14, an attachment assembly 21, or other appropriate location. Base 24 may further include an overmolded mounting bracket (e.g., shown as reference 62 in FIGS. 7A-7C) for rigidity and which comprises 304 Stainless Steel in one embodiment.

As mentioned above, the device 10 is intended to remain in a fixed location once it has been installed to monitor for the presence of radiation during use in some implementations. The tamper detection circuitry 39 may be configured to monitor for tampering including the occurrence of removal of the enclosure assembly 31 and components therein from the template 26 remaining at the installed, fixed location in some embodiments.

Figure 5:
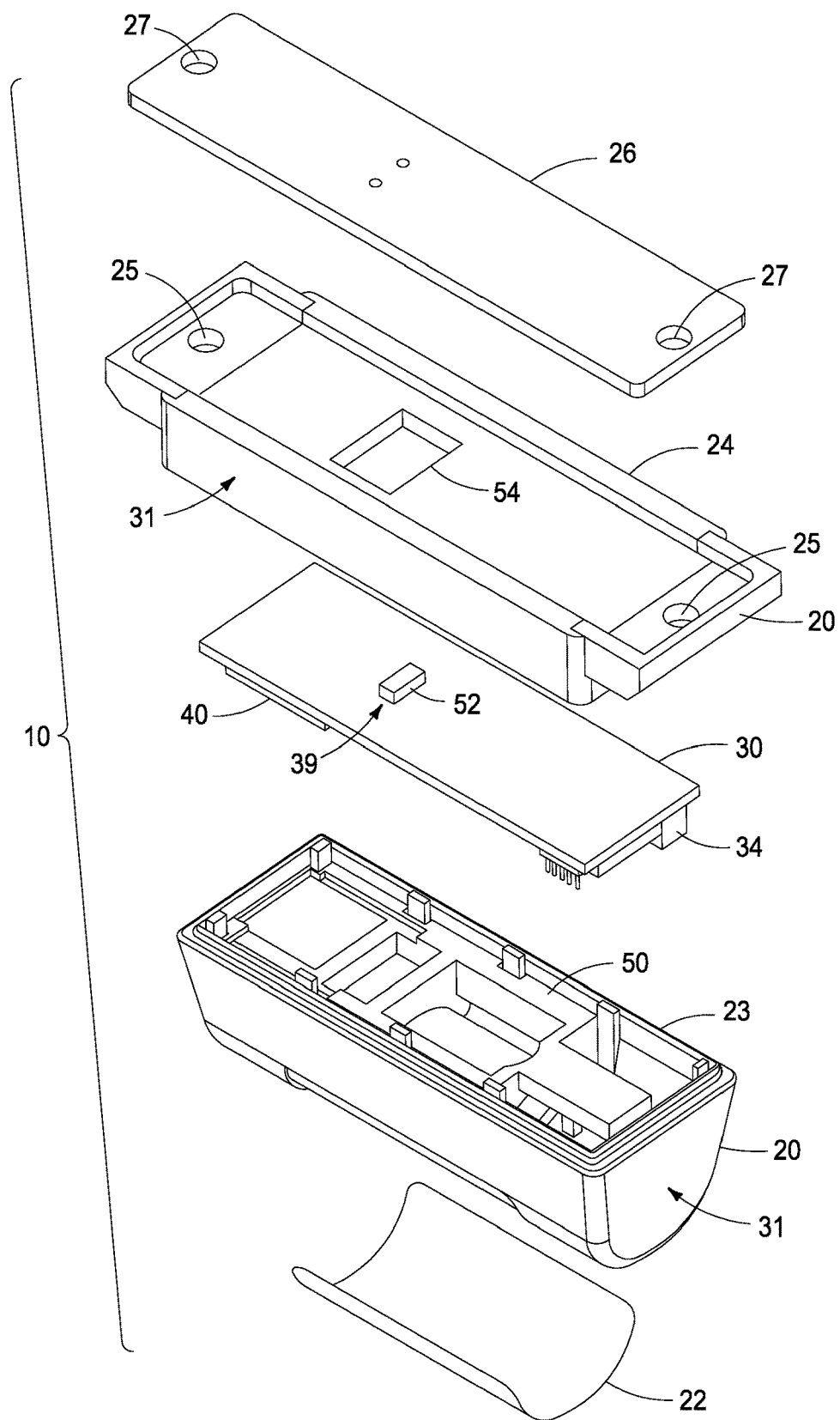
FIG. 5 is an exploded bottom isometric view of a radiation monitoring device according to one embodiment.

In the illustrated example embodiment, tamper detection circuitry 39 includes a magnet 28 that is mounted upon template 26 and circuitry of the PCB 30 is configured to monitor for the presence of magnet 28 and the removal of base 24 from template 26 (and magnet 28) may be detected by a reed-switch 52 (the reed-switch is shown in FIG. 5) of the tamper detection circuitry 39 to indicate tampering of device 10 including removal of the enclosure assembly 31 from template 26 that may indicate removal of the device 10 from the storage container 14 or other fixed radiation monitoring location. In one embodiment, magnet 28 is a NdFeB magnet. Following detection of removal of the enclosure assembly 31 from the template 26, processing circuitry 33 may set a flag or status to include in external communications indicating the possible tampering.

Referring to FIG. 5, an exploded bottom view of the radiation monitoring device 10 of FIG. 2 is illustrated.

Top 23 of housing 20 includes a battery bracket 50 configured to receive a battery (the battery is not shown in FIG. 5).

Reed-switch 52 is mounted upon a surface of PCB 30 opposite to the surface of PCB 30 shown in FIG. 4. Reed-switch 52 is positioned at a location opposite and corresponding to a location of magnet 28 upon template 26 and that receives the magnetic field thereof during use of device 10. Base 24 of housing 20 includes a pocket 54 to receive magnet 28 of template 26 when device 10 is assembled.

In one embodiment, top 23, base 24, template 26 and battery bracket 50 are fabricated using Ultem® 1000 polyetherimide polymer that is available from Emco Industrial Plastics, Inc.

Figure 6:
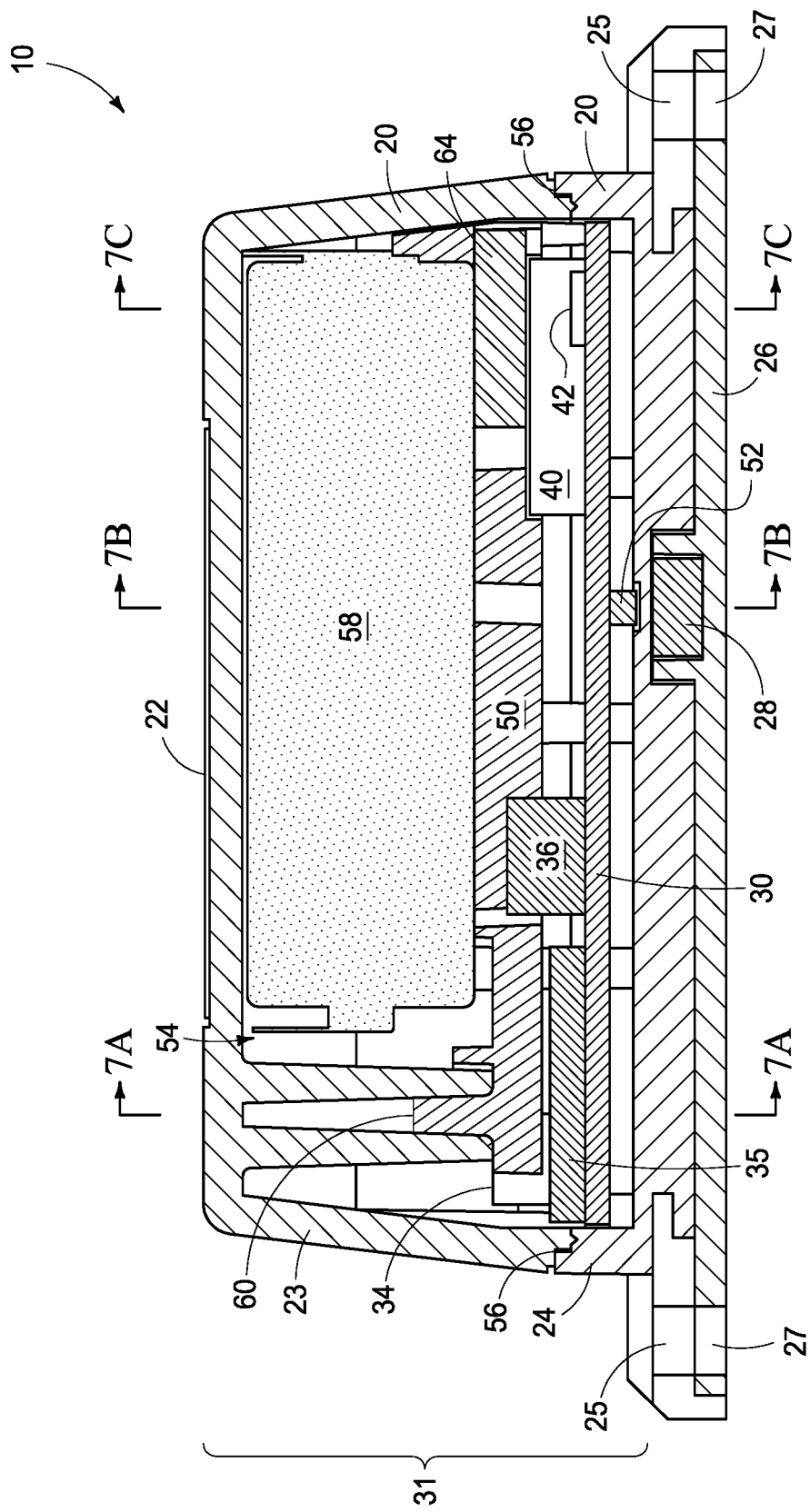
FIG. 6 is a cross-sectional side view of one embodiment of a radiation monitoring device taken through section line 6 of FIG. 7A.

Referring to FIG. 6, a cross-sectional view of one embodiment of the radiation monitoring device 10 is shown taken along section line 6 of FIG. 7A. FIG. 6 illustrates a sonic welded rib 56 between top 23 and base 24. Battery 58 is provided within battery bracket 50 which is joined with top 23 of housing 20 at an interlocking boss 60. Battery connector 34 is electrically connected with terminals of battery 58.

A radiation shield 64 is provided directly over metal can 40 and radiation detector 42 in the illustrated embodiment. In one embodiment, radiation shield 64 is a heavy metal, such as lead or Tungsten in illustrative examples. Radiation shield 64 is positioned and configured to reduce an amount of radiation from reaching the radiation detector 42 from the top 23 of the housing 20 and received at radiation shield 64. In one embodiment, the device 10 is positioned with respect to the storage container 14 such that the radiation detector 42 is positioned in a direction towards the source 16 and radiation from the source 16 is primarily received through the base 24 and template 26 and then detected by the radiator detector 42 while the radiation shield 64 positioned on the opposite side of the radiation detector 42 shields the radiation detector 42 from radiation coming from other sources and entering through the top 23 of housing 20, such as radiation sources that may be placed adjacent to the respective device 10 and storage container 14 being monitored.

Referring to FIGS. 7A-7C, cross-sectional end views of one embodiment of radiation monitoring device 10 are shown taken along respective section lines 7A, 7B, 7C of FIG. 6.

Integrated circuit 35, battery connector 34 and an over-molded mounting bracket 62 are shown in FIG. 7A. The top 23 and base 24 of housing 20 are sonic welded in one configuration to define a light-tight compartment 55 within the enclosure assembly 31. The magnet 28 and reed-switch 52 are shown in FIG. 7B. Metal can 40, radiation detector 42 and radiation shield 64 are shown in FIG. 7C.

As mentioned above, the communications circuitry 32 is configured to output various information regarding the radiation monitoring device 10. In one embodiment, the communications circuitry 32 outputs information that is indicative of an amount of radiation received and detected by the device 10 (e.g., number of detected radiation counts over a period of time). This permits remote monitoring of a radiological source and storage container, and the amount of detected radiation may be compared to one or more threshold to indicate an alarm condition.

In addition, the communications circuitry 32 may communicate additional information including information regarding a current energy level (e.g., remaining life) of battery 58 and information regarding detected tampering with respect to device 10 (e.g., indicating intrusion into the enclosure assembly 31 and/or removal of the enclosure assembly 31 from the template 26).

The communications circuitry 32 may also be configured to communicate one or more identification codes that uniquely identifies the radiation monitoring device 10 as well as the radiological source 16 and radiological material storage container 14 being monitored.

As also mentioned herein, radiation monitoring device 10 is configured in some embodiments to implement power management operations to reduce an amount of electrical energy that is used by the device 10 over time resulting in an increase in the service life of the device 10 compared to arrangements where the power management operations are omitted. Example power management operations include the processing circuitry 33 controlling the communications circuitry 32 to only emit communications periodically and controlling power consumption by the radiation detector 42, including powering down the radiation detector 42 during the emission of communications from the device 10.

In one embodiment, the processing circuitry 33 is configured to monitor the status of battery 58 including the remaining energy level of the battery 58. An example implementation of monitoring of the battery 58 is discussed below with respect to FIG. 8B. The monitored energy level of the battery 58 may be stored and communicated externally of the device 10 within the emitted communications to alert the remote monitoring system of the possible depletion of the battery 58, perhaps avoid false alarms and indicate replacement of the device 10.

FIG. 8 is a map illustrating how FIGS. 8A-8F are to be arranged. Example circuitry of a radiation detector device is shown in FIGS. 8A-8F according to one embodiment.

FIG. 8A shows circuitry associated with reed-switch 52.

Figure 8B:
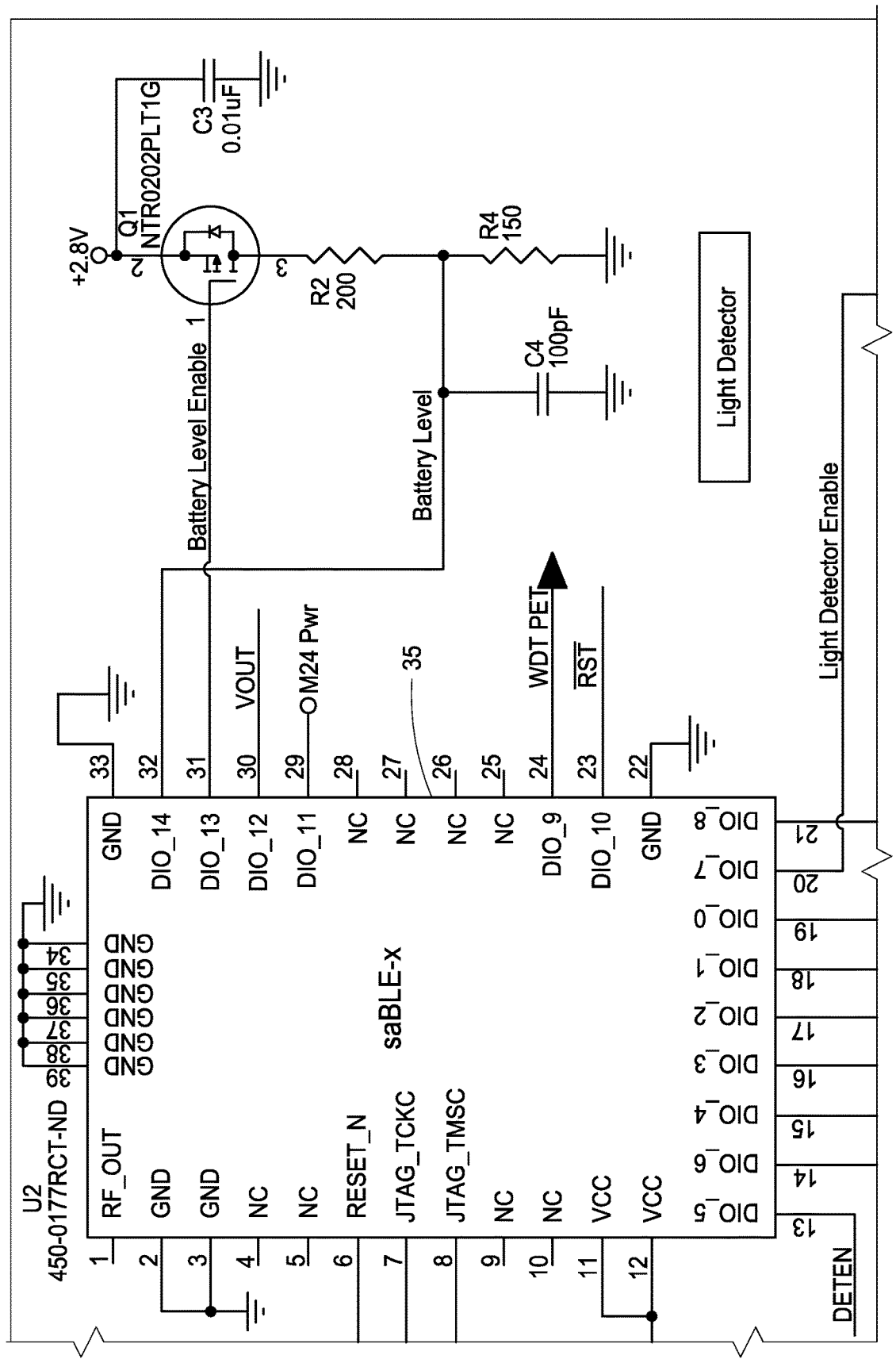

FIG. 8B includes an example integrated circuit 35 that comprises processing circuitry and communications circuitry discussed above and associated connections. A battery level circuit including Q1, R2, R4 and C4 are shown in FIG. 8B enabling processing circuitry of integrated circuit 35 to monitor a level of the battery. In the illustrated circuit, the processing circuitry periodically enables a battery level enable signal to Q1 that creates an additional load of 8 mA for a few microseconds. The processing circuitry senses the voltage of a Battery level signal via an analog to digital converter and compares the battery voltage to a threshold. If the voltage is under the threshold, the processing circuitry logs the low battery status that may be included in the external communications as mentioned above.

Figure 8C:
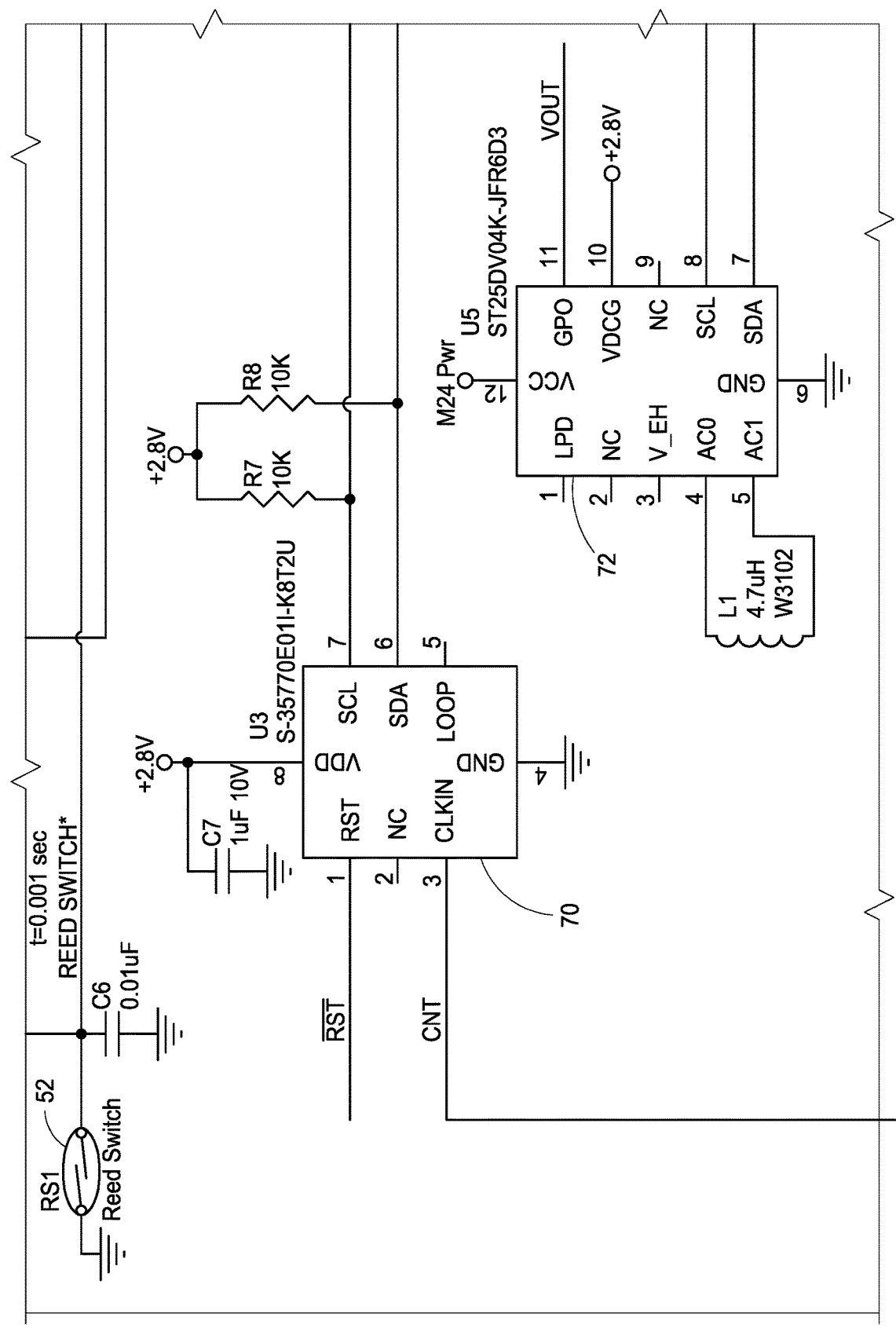

FIG. 8C is a schematic representation of an event counter 70, NFC receiver 37 implemented as an integrated circuit 72 and reed-switch 52. Event counter 70 counts a number of pulses received from radiation detector 42 and corresponding to radiation counts or activity. NFC receiver integrated circuit 72 is utilized to implement power management operations and configuration operations of the radiation monitoring device 10 as well as storage of configuration data from an NFC programmer as discussed herein.

Figure 8D:
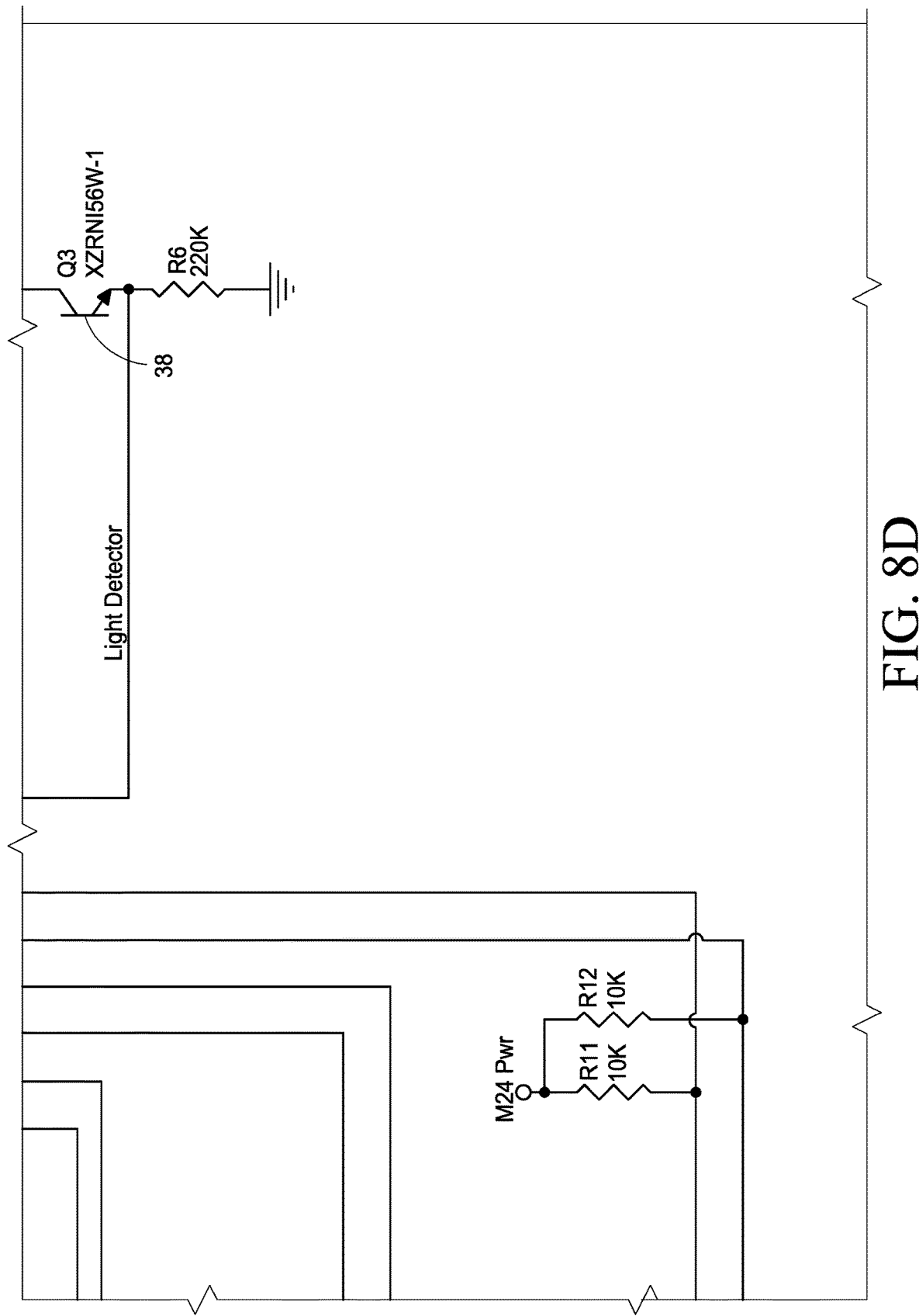

FIG. 8D is a schematic representation of one embodiment of light detector 38.

Figure 8E:
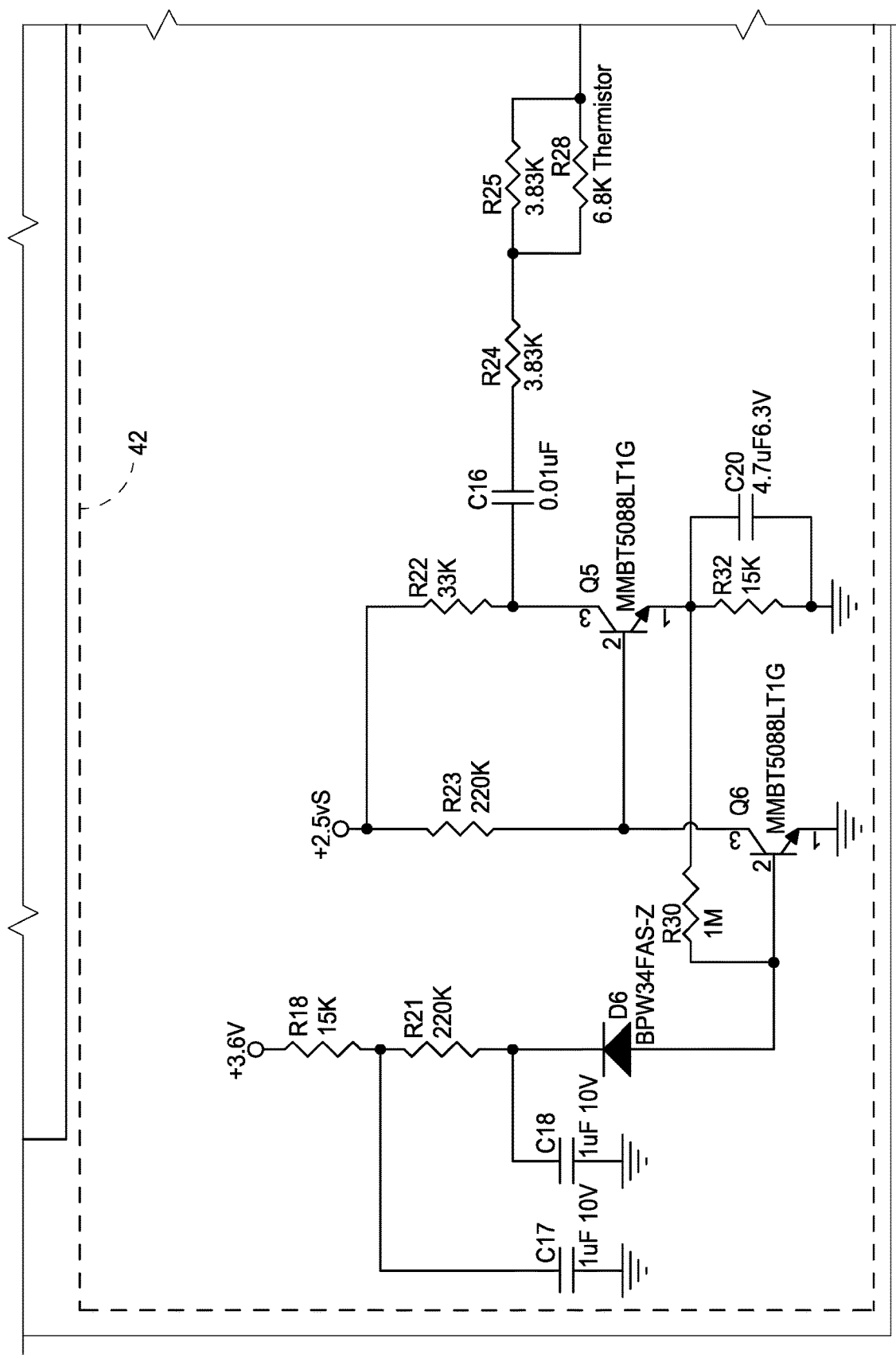
Figure 8F:
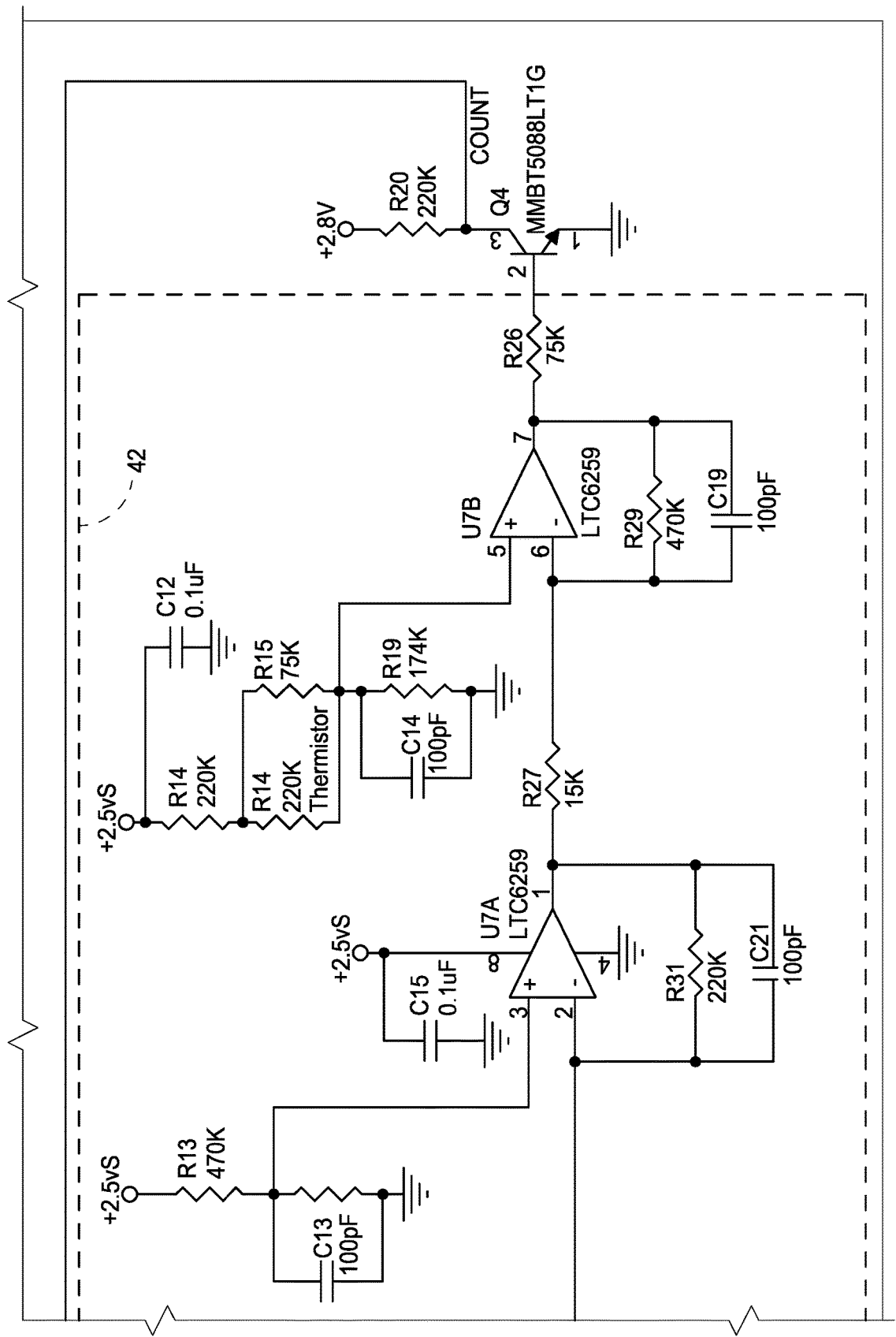

FIGS. 8E-8F are a schematic representation of one embodiment of radiation detector 42. To account for temperature fluctuations, the depicted circuitry includes a 6.8 k thermistor R28 that increases the gain of the op-amp to compensate for the loss of gain of the photodiode of the detector. In addition, a 220 k thermistor is used to decrease a threshold voltage of the detector to compensate for temperature fluctuations.

Figure 9:
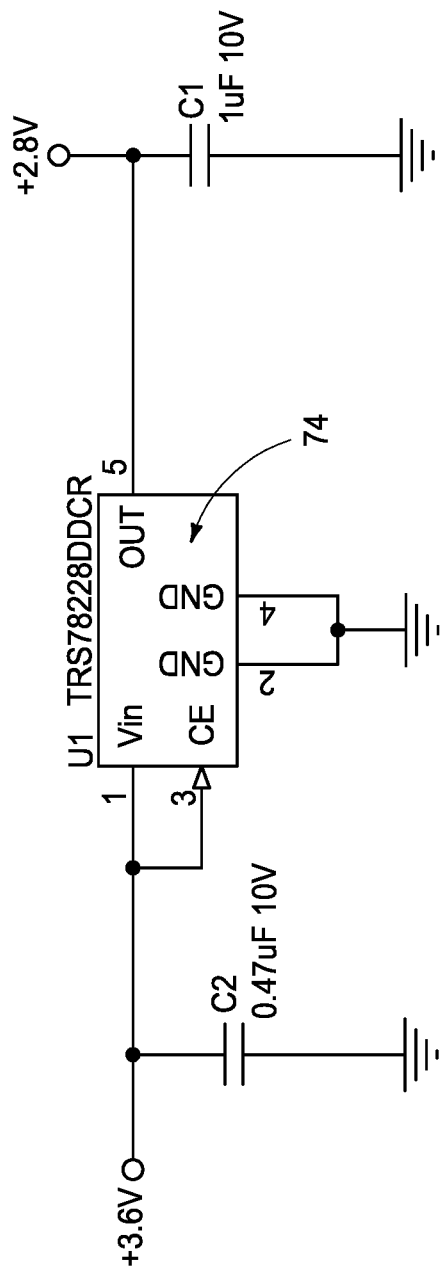
FIG. 9 is a schematic representation of circuitry of one embodiment of a voltage regulator.

FIG. 9 is a schematic representation of one embodiment of circuitry of a voltage regulator 74 that supplies 2.8 V to the circuitry illustrated in FIGS. 8A-8F.

Figure 10:
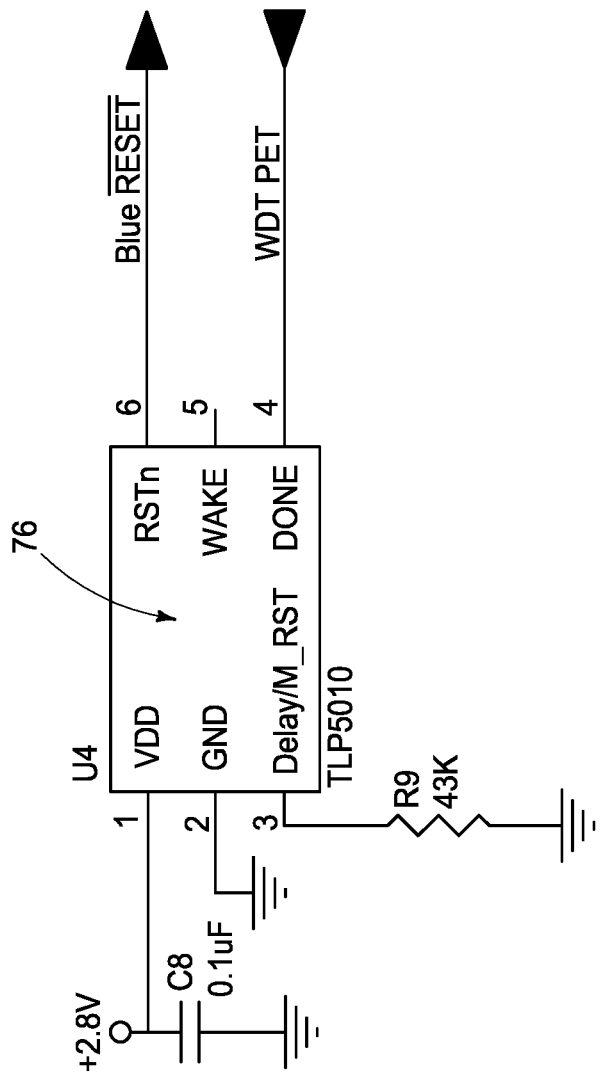
FIG. 10 is a schematic representation of circuitry of one embodiment of a watchdog timer.

FIG. 10 is a schematic representation of one embodiment of circuitry of a watchdog timer 76. Watchdog timer 76 is used to reset integrated circuit 35 if the watchdog timer 76 does not receive a toggle signal from integrated circuit 35 within a predefined amount time. Timer 76 is designed to prevent the integrated circuit 35 from malfunctioning due to hardware/firmware faults.

Figure 11:
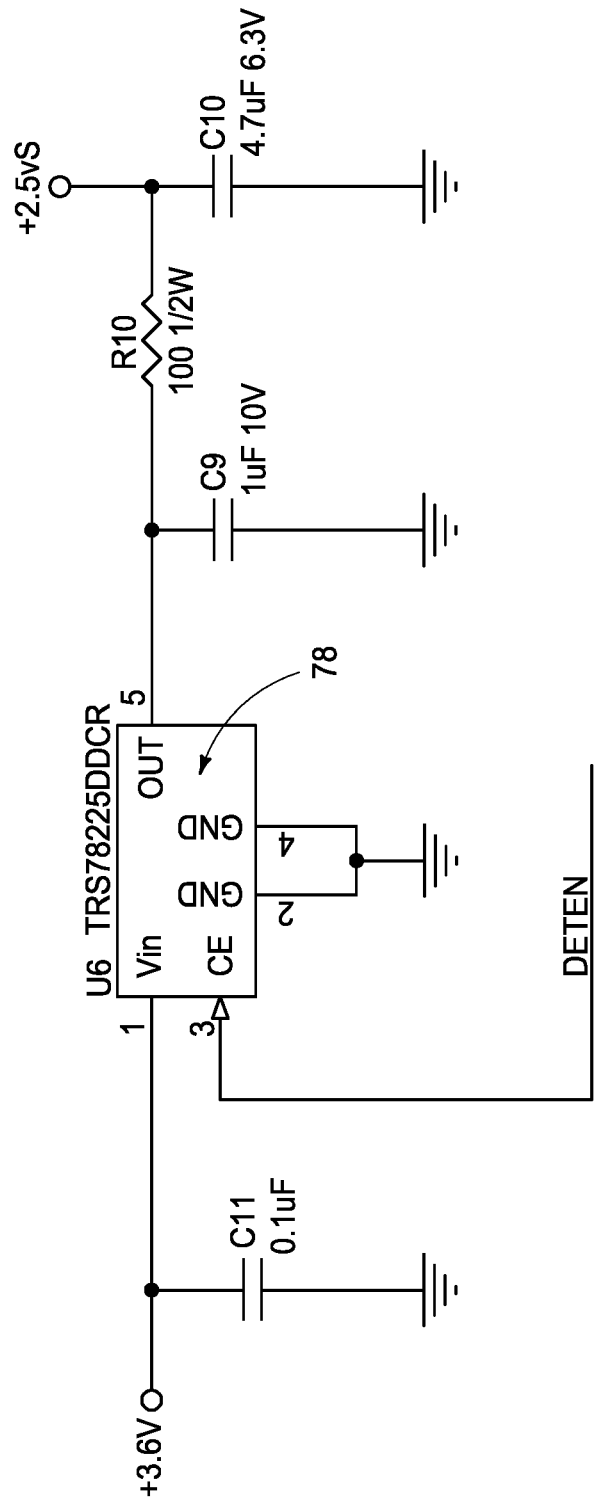
FIG. 11 is a schematic representation of circuitry of one embodiment of a voltage regulator.

FIG. 11 is a schematic representation of one embodiment of circuitry of a voltage regulator 78. Voltage regulator 78 may be selectively turned off and on to implement power management operations and conserve electrical energy in one embodiment. For example, voltage regulator 78 provides operational energy to the radiation detector 42 and the voltage regulator 78 and radiation detector 42 may be selectively powered down to conserve energy from the battery 58.

As described according to example embodiments herein, the communication of information regarding the radiation detected by the radiation monitoring devices 10 externally of the devices 10 enables remote monitoring of the radiological source in real time. The information may indicate the amount of radiation measured and that may be compared to various thresholds to determine whether the radiological source is present and within the storage container, the source is absent, and/or the source is outside of the radiation material storage container. Different alarms or notifications may be made based upon the information regarding the monitored radiation that is received from the devices 10.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A radiation monitoring device comprising:
a housing configured to pass radiation emitted from a radiological source located in proximity to the radiation monitoring device;
a radiation detector configured to receive the radiation emitted from the radiological source and to generate information regarding the radiation;
communications circuitry configured to communicate the information regarding the radiation in a plurality of communications at a plurality of different moments in time externally of the radiation monitoring device; and
processing circuitry configured to control the radiation detector and the communications circuitry to consume different amounts of electrical energy.

2. The device of claim 1 wherein the housing is configured to be attached to a radiation material storage container which includes the radiological source.

3. The device of claim 1 wherein the communications circuitry is configured to communicate the information including information that is indicative of an amount of the radiation detected by the radiation detector.

4. The device of claim 1 wherein the communications circuitry is configured to communicate an identification code that uniquely identifies the radiation monitoring device.

5. The device of claim 1 further comprising a battery configured to provide electrical energy to the radiation detector and the communications circuitry.

6. The device of claim 5 wherein the processing circuitry is configured to monitor an energy level of the battery, and wherein the communications circuitry is configured to communicate information regarding the energy level externally of the radiation monitoring device.

7. The device of claim 1 further comprising tamper detection circuitry configured to detect tampering with respect to the radiation monitoring device.

8. The device of claim 7 wherein the communications circuitry is configured to communicate information regarding the tampering externally of the radiation monitoring device.

9. The device of claim 1 wherein the communications circuitry is configured to communicate the information regarding the radiation in the communications comprising wireless communications.

10. The device of claim 1 further comprising a radiation shield positioned adjacent to the radiation detector and configured to shield the radiation detector from radiation received at the radiation shield.

11. The device of claim 1 wherein the radiation detector is powered on to generate the information regarding the radiation and the radiation detector is powered off during the communication of the information at the moments in time.

12. The device of claim 1 wherein the moments in time are first moments in time, and wherein the communications circuitry is provided in a first mode of operation at the first moments in time where the communications circuitry consumes an increased amount of electrical energy compared with a plurality of second moments in time between the first moments in time.

13. The device of claim 1 wherein the housing is configured to be attached to a radiation material storage container which includes the radiological source, and wherein the communications circuitry is configured to communicate information that identifies the radiation material storage container.

14. A radiation monitoring device comprising:
a housing configured to pass radiation emitted from a radiological source located in proximity to the radiation monitoring device;
a radiation detector configured to receive the radiation emitted from the radiological source and to generate information regarding the radiation;
communications circuitry configured to communicate the information regarding the radiation in a plurality of communications at a plurality of different moments in time externally of the radiation monitoring device; and
processing circuitry configured to receive a wake-up signal and to control the radiation detector to initiate monitoring of the radiation and to control the communications circuitry to initiate the communication of the information as a result of the reception of the wake-up signal.

15. The device of claim 14 wherein the communications circuitry comprises first communications circuitry, and further comprising second communications circuitry configured to receive operational energy from external of the radiation monitoring device and to use the operational energy to generate the wake-up signal.

16. A radiation monitoring device comprising:
a housing configured to pass radiation emitted from a radiological source located in proximity to the radiation monitoring device;
a radiation detector configured to receive the radiation emitted from the radiological source and to generate information regarding the radiation;
communications circuitry configured to communicate the information regarding the radiation in a plurality of communications at a plurality of different moments in time externally of the radiation monitoring device;
tamper detection circuitry configured to detect tampering with respect to the radiation monitoring device; and
wherein the housing comprises:
an enclosure configured to house the radiation detector and the communications circuitry; and
a template configured to be attached to a radiological material storage container that includes the radiological source, and wherein the tamper detection circuitry is configured to detect removal of the enclosure from the template.

17. A radiation monitoring device comprising:
a housing configured to pass radiation emitted from a radiological source located in proximity to the radiation monitoring device;
a radiation detector configured to receive the radiation emitted form the radiological source and to generate information regarding the radiation;
communications circuitry configured to communicate the information regarding the radiation in a plurality of communications at a plurality of different moments in time externally of the radiation monitoring device;
tamper detection circuitry configured to detect tampering with respect to the radiation monitoring device; and
wherein the housing comprises an enclosure configured to house the radiation detector, the tamper detection circuitry and the communications circuitry within a light-tight compartment, and wherein the tamper detection circuitry is configured to detect a presence of light within the light-tight compartment.

18. A radiation monitoring device comprising:
a housing configured to pass radiation emitted from a radiological source located in proximity to the radiation monitoring device;
a radiation detector configured to receive the radiation emitted from the radiological source and to generate information regarding the radiation;
communications circuitry configured to communicate the information regarding the radiation in a plurality of communications at a plurality of different moments in time externally of the radiation monitoring device; and
a radio frequency shield configured to shield the radiation detector from electromagnetic energy within the housing.

19. The device of claim 18 further comprising a radiation shield positioned adjacent to the radiation detector and configured to shield the radiation detector from radiation received at the radiation shield.

20. A radiation monitoring device comprising:
a housing configured to pass radiation emitted froma radiological source located in proximity to the radiation monitoring device;
a radiation detector configured to receive the radiation emitted from the radiological source and to generate information regarding the radiation ;
communications circuitry configured to communicate the information regarding the radiation in a plurality of communications at a plurality of different moments in time externally of the radiation monitoring device; and
wherein the communications each include information that identifies the radiological source.

* * * * *